US010851272B2

(12) United States Patent
Thiele et al.

(10) Patent No.: US 10,851,272 B2
(45) Date of Patent: Dec. 1, 2020

(54) TWO-COMPONENT POLYURETHANE ADHESIVE FOR ADHESIVELY BONDING MOLDED FIBER PARTS

(71) Applicant: Henkel AG & Co. KGaA, Duesseldorf (DE)

(72) Inventors: Lothar Thiele, Langenfeld (DE); Silvana Pölitz, Erkrath (DE); Klaus Jurkschat, Dortmund (DE); Thomas Zöller, Essen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 15/613,535

(22) Filed: Jun. 5, 2017

(65) Prior Publication Data

US 2018/0051196 A1 Feb. 22, 2018

Related U.S. Application Data

(63) Continuation of application No. PCT/EP2015/076753, filed on Nov. 17, 2015.

(30) Foreign Application Priority Data

Dec. 17, 2014 (DE) .................... 10 2014 226 277

(51) Int. Cl.

| C09J 175/04 | (2006.01) |
|---|---|
| C08G 18/76 | (2006.01) |
| C08G 18/79 | (2006.01) |
| C08G 18/32 | (2006.01) |
| C08G 18/72 | (2006.01) |
| C08G 18/66 | (2006.01) |
| C08G 18/36 | (2006.01) |
| C08G 18/48 | (2006.01) |
| C08G 18/24 | (2006.01) |
| B29B 7/72 | (2006.01) |
| C08K 7/14 | (2006.01) |

(52) U.S. Cl.
CPC ............ *C09J 175/04* (2013.01); *B29B 7/726* (2013.01); *C08G 18/244* (2013.01); *C08G 18/246* (2013.01); *C08G 18/3215* (2013.01); *C08G 18/36* (2013.01); *C08G 18/4829* (2013.01); *C08G 18/6696* (2013.01); *C08G 18/724* (2013.01); *C08G 18/7671* (2013.01); *C08G 18/792* (2013.01); *C08K 7/14* (2013.01)

(58) Field of Classification Search
CPC .. C09J 175/04; C08G 18/3215; C08G 18/792; C08G 18/246; C08G 18/7671; C08G 18/724; C08G 18/6696; C08G 18/36; C08G 18/4829; C08G 18/244; C08K 7/14; B29B 7/726
See application file for complete search history.

(56) References Cited

U.S. PATENT DOCUMENTS

| 3,387,016 A * | 6/1968 | Nitzsche .............. C07F 7/1836 528/38 |
|---|---|---|
| 5,349,040 A * | 9/1994 | Trinks ................ C08G 18/0885 521/155 |
| 5,803,783 A | 9/1998 | Holmstrom et al. |
| 6,348,121 B1 * | 2/2002 | Schoener ............. C08G 18/089 156/307.1 |
| 7,931,970 B2 | 4/2011 | Schlingloff et al. |
| 8,378,019 B2 | 2/2013 | Juul |
| 8,946,372 B2 | 2/2015 | Richter et al. |
| 9,284,222 B2 | 3/2016 | Kiesewetter et al. |
| 2004/0138402 A1 | 7/2004 | Thiele et al. |
| 2005/0245716 A1* | 11/2005 | Jansen ................... C08G 18/10 528/44 |
| 2010/0297427 A1* | 11/2010 | Schlingloff ........ C08G 18/3284 428/317.7 |
| 2011/0054140 A1* | 3/2011 | Krause ................ B01J 31/0211 528/53 |
| 2012/0220717 A1* | 8/2012 | Richter ................ B01J 31/0201 524/590 |
| 2013/0288060 A1* | 10/2013 | Pind ................... C08G 18/3215 428/423.1 |

(Continued)

FOREIGN PATENT DOCUMENTS

| CN | 101370891 A | 2/2009 |
|---|---|---|
| CN | 102574971 A | 7/2012 |

(Continued)

OTHER PUBLICATIONS

International Search Report for International PCT Patent Application No. PCT/EP2015/076753 dated Feb. 5, 2016.
DIN 53240-1 (2012).

*Primary Examiner* — Rabon A Sergent
(74) *Attorney, Agent, or Firm* — James E. Piotrowski

(57) ABSTRACT

The invention relates to a two-component polyurethane adhesive containing i) a polyol component including a mixture of three different polyols to ensure crosslinking for a mechanically stable adhesive bonding, and also to achieve hydrophobia to ensure that the crosslinked adhesive layer is impervious to moisture, and glass fibers, and ii) an isocyanate component containing polyisocyanates in an NCO/OH ratio of 0.9:1 to 1.5:1. The polyol component further includes a metal catalyst. The two-component adhesive has a high adhesive strength, a high glass temperature, a low curing time and a sufficiently long processing time, which can adhesively bond also substrates having uneven surfaces. The invention further relates to an article comprising the two-component polyurethane adhesive.

18 Claims, No Drawings

(56) References Cited

U.S. PATENT DOCUMENTS

2015/0240139 A1\* 8/2015 Kelch ................ C08G 18/4829
                                                          428/423.1
2015/0247075 A1   9/2015 Thiele et al.

FOREIGN PATENT DOCUMENTS

| DE | 19935452 A1 | | 3/2001 |
|---|---|---|---|
| EP | 1857480 A1 | \* | 11/2007 |
| EP | 2768789 A1 | | 8/2014 |
| WO | 02066572 A1 | | 8/2002 |
| WO | 2009080740 A1 | | 7/2009 |
| WO | 2012134849 A1 | | 10/2012 |
| WO | 2014076206 A1 | | 5/2014 |

\* cited by examiner

TWO-COMPONENT POLYURETHANE ADHESIVE FOR ADHESIVELY BONDING MOLDED FIBER PARTS

The present invention relates to a two-component polyurethane adhesive (two-component PU adhesive) that has a high adhesive strength as well as a high glass transition temperature. Furthermore, this adhesive should also have a sufficiently long processing time, even at high ambient temperatures, should be able to adhesively bond even substrates that have uneven surfaces, and should fixedly bridge gaps or intermediate spaces.

Polyol and polyisocyanate-based two-component polyurethane adhesives have long been known. Two-component PU adhesive can advantageously cure even at room temperature ("cold curing") after the components have been mixed, and therefore can quickly absorb higher forces after a brief curing time. Use as structural adhesives, however, results in high demands on such adhesive in terms of strength and bonding strength, because such adhesives represent an element of load-bearing structures. High strength is commonly achieved by high crosslinking density. This is very often achieved by increasing the concentration of functional groups and using higher-functional polyols or polyamines as well as higher-functional polyisocyanates, which may lead to embrittlement of the adhesive joint at excessively high crosslinking densities.

WO 2002/066572 A1 describes two-component PU adhesives for wood materials, which contain 10 to 98% by weight at least one oleochemical polyol, 1 to 7.5% by weight at least one diol having a hydroxyl value between 400 and 2000, and 1 to 7.5% by weight at tri-, tetra-, or pentafunctional polyol having a hydroxyl value of 200 to 2000, as well as other auxiliaries and a resin, wherein the adhesive can be crosslinked via polyisocyanates.

WO 2009/080740 A1 discloses a two-component PU adhesive composed of a polyol component containing 2 to 30% by weight at least one polyester diol having a molecular weight of more than 1,000 g/mol, 5 to 35% by weight at least one 3 to 14 functional polyol, 5 to 35% by weight hydrophobic polyols, and 2 to 65% by weight other additives or auxiliaries, wherein the sum thereof should give 100% by weight, as well as a crosslinking component made of polyisocyanates in an NCO/OH ratio of 0.9:1 to 1.5:1, wherein the crosslinked adhesive has a glass transition temperature (Tg) greater than 50° C. EP 2468789 A1 discloses two-component PU compositions comprising castor oil, at least one alkoxylated aromatic diol, at least one polyol having 5 to 8 hydroxy groups, and at least one polyisocyanate. It is stated that these compositions should have a long "open time" and should still be able to be glued after a longer period of exposure to a climate with high humidity (e.g. 70% relative humidity) even after 40 minutes, in particular even after 60 minutes, and to be cured to form polymers with a high mechanical strength, so that a structural bonding is produced. These two-component polyurethane compositions are suitable for use as structural adhesives, in particular for gluing wing half-shells of rotor blades for wind turbines.

Wing half-shells of rotor blades for wind turbines are generally composed of glass fiber-reinforced plastic substrates and optionally metallic structural elements. These components must have a high mechanical stability. It is therefore desirable for the corresponding adhesives to also be able to absorb corresponding forces. In addition to the aforementioned adhesive bonding of fiber-reinforced components in order to prepare wings for wind turbines, there are also a large number of other fields of use that have similar requirements for adhesive bonding of components. Examples thereof include adhesive bonding of fiber-reinforced components for wings or other attachment parts of aircraft, or adhesive bonding of fiber-reinforced components in boat and ship construction. There are high mechanical requirements for the adhesively bonded components. High tensile forces need to be absorbed. Furthermore, the adhesively bonded components must withstand loading with permanent vibrations, which can lead to material fatigue. Furthermore, the environmental influences are high, and high stability even with high temperature fluctuations must be ensured, along with properties that remain constant at different levels of humidity. Alternatively bonding such components with two-component epoxy adhesives is known. These exhibit sufficient strength, but have a variety of disadvantages in processing. Thus, high curing temperatures are needed in order to obtain sufficient strength. Furthermore, the substrate surfaces must be specially prepared for the adhesive bonding.

There is particular need for adhesives that have a long open time and thus are especially suitable for adhesively bonding large surfaces, and that also exhibit sufficient mechanical stability when in the cured state under diverse weather and temperature conditions.

The present invention therefore addresses the problem of providing an adhesive having improved properties. The adhesive should exhibit very favorable physical and mechanical properties when in the cured state. The curing time should be curtailed. The adhesive should, however, have a sufficiently long open time, even at increased ambient temperature and high relative humidity, such as occurs in subtropical and tropical areas where temperatures can be between 15° C. and 50° C. and relative humidity (RH) can be between 0% and 85%. It should also be possible to ensure stable adhesion of uneven surfaces under these conditions. Furthermore, the crosslinked adhesive layers should be impervious to moisture and different ambient temperatures, and remain stable in terms of the mechanical properties. The cured adhesive should thus also have a high resistance to aging, even in moist climates. Finally, the adhesive should have a high glass transition temperature after curing. Typically, polyurethanes having a high glass transition temperature are prepared from short-chain aliphatic polyols and aromatic polyisocyanates, but these substances have short pot lives.

The problem is solved by a two-component polyurethane adhesive comprising:
I) a polyol component containing at least one catalyst and
 (a) 2 to 30% by weight at least one oleochemical polyol having a number-average molecular weight (Mn) of at least 500 g/mol;
 (b) 5 to 35% by weight at least one polyol that is different from (a) and has 3 to 14 hydroxy groups;
 (c) 5 to 35% by weight at least one polyol that is different from (a) and (b) selected from ethoxylated and/or propoxylated polyphenols;
 (d) 1 to 65% by weight glass fibers or a mixture of different glass fibers;
 (e) 0 to 65% by weight at least one additive or auxiliary that is different from (a) to (d);
  wherein the mass fractions of the components (a) to (e) are relative to the total weight of the polyol component; and
II) an isocyanate component containing aromatic and/or aliphatic polyisocyanates in an NCO/OH ratio of 0.9:1 to 1.5:1;

wherein the crosslinked two-component polyurethane adhesive has a glass transition temperature (Tg) of at least 65° C.

Another subject matter of the present invention is a method for adhesively bonding two substrates, preferably selected from metal, plastic, and foam substrates, fiber composites, and fiber-containing shaped bodies, especially preferably selected from fiber composites and fiber-containing shaped bodies, based on glass fibers, carbon fibers, natural fibers, or synthetic fibers (made of synthetic polymers), embedded in an adhesive matrix, with which first the two-component polyurethane adhesive according to the present invention is applied to the adherent surface of the first substrate and then the second substrate is laid with the adherent surface thereof on the first substrate.

Preferred embodiments can be found in the dependent claims.

Known shaped bodies made of high-strength fiber composites are suitable for the adhesive bonding according to the present invention. These may contain, for example, metal fibers, ceramic fibers, glass fibers, carbon fibers, natural fibers, or synthetic fibers (made of synthetic polymers), and combinations thereof. Glass fibers, carbon fibers, natural fibers, or synthetic fibers are especially preferable. Corresponding examples of these categories can be found in A. R. Bunsell, J. Renard "Fundamentals of Fibre Reinforced Composite Materials", CRC Press 2005, ISBN 0750306890.

Examples of suitable synthetic fibers are polyester fibers, polyethylene fibers, polypropylene fibers, polyimine fibers, poly(meth)acrylate fibers, or polyamide fibers, such as fibers made of polyamide-6, polyamide-6.6, or polyaramide (poly(p-phenylene terephthalamide)). Ceramic fibers comprise oxide and non-oxide ceramic fibers, such as aluminum oxide fibers, silicon dioxide fibers, basalt fibers, or carbon silicide fibers. Examples of suitable metal fibers are fibers made of steel, stainless steel, and aluminum. Examples of suitable natural fibers are wood fibers, sisal fibers, flax fibers, hemp fibers, coconut fibers, banana fibers, and jute fibers.

These fibers are incorporated into a plastic matrix, preferably in the form of mats, woven fabrics, layered fabrics, non-woven fabrics, or wovings. The plastic matrix may, for example, be composed of polyesters, polyepoxides, polyurethanes, polyvinyl esters, hybrid resins based on polyvinyl esters, polystyrene, and diphenylmethane diisocyanate, or hybrid resins based on unsaturated polyesters, polystyrene, and diphenylmethane diisocyanate, which react to form a thermosetting polymer. Such fiber-reinforced substrates are known to a person skilled in the art. They are used, for example, in aircraft construction, in boat building, or in other components subjected to high mechanical stress. A special area of use of such adhered substrates is blades for wind turbine rotors. Methods for preparing such shaped parts are known. Such blades are, for example, manufactured in mold cavities and crosslinked. The mold is here frequently constructed as a half mold. The side facing the mold is generally obtained as a smooth, ready-to-use surface, while the other side may and is usually intended to be further processed. As manufacture of the blades continues, two or more of these substrates are glued to one another. The adherent side is generally the side facing away from the mold. The surface should be of a structure such that the adherent substrate parts are approximately form fitting. The surface provided for adhesive bonding may be rough and in itself uneven. Sanding or milling to form an exact mirror-image shape to the adherent counterpart is not necessary according to the present invention. Surprisingly, pretreatment of the adherent surfaces is not required when using the adhesive according to the present invention. A substantially grease-free surface is, however, advantageous for application of the adhesive. The use of primers is not necessary.

One known working method involves covering the surfaces on the outer side of the shaped parts for crosslinking with a tear-resistant protective woven fabric before the parts are prepared in the mold for crosslinking. This may be completely torn off immediately before subsequent adhesive bonding, thus providing a suitable surface. It is, however, also possible, roughly to machine such surfaces and to adapt them to the corresponding counterpart. The adhesive according to the present invention may then be applied onto the substrate surfaces prepared in this manner and freed from lose particles.

The adhesive bonding of fiber composites, in particular, blades for wind turbine rotors, should preferably fulfill a number of requirements. Thus, the adhesive should preferably be applicable at 15° C. to 50° C. and 0 to 85% relative humidity (RH), more preferably 20° C. to 40° C. and 20 to 85% RH. The curing may preferably take place at 60° C. to 90° C., especially preferably 70° C. to 80° C. The adhesive bonding preferably has a tensile shear strength of at least 12 MPa. Furthermore, the adhesive, when in the cured state, preferably has a tensile strength of at least 40 MPa, preferably a modulus of elasticity (E-modulus) of at least 2,000 MPa, further preferably at least 2,500 MPa, still further preferably at least 3,000 MPa, especially preferably at least 3,500 MPa, most preferably at least 4,000 MPa, and preferably an elongation at break of at least 1%, even after moist storage. The heat distortion temperature should preferably be at least 65° C. This signifies that the crosslinked, i.e., cured adhesive must have a glass transition temperature of at least 65° C.

The two-component PU adhesive according to the present invention, which fulfills the aforementioned requirements, is preferably pasty but may then also exhibit, in particular, thixotropic properties. It comprises a polyol component and an isocyanate component. Both these components are mixed immediately prior to application. The polyol component must contain various polyols. Thus, on the one hand, should ensure sufficient crosslinking for a mechanically stable adhesive bonding, even under thermal loading. On the other hand, the selection of the different polyols should achieve sufficiency hydrophobia, so that the open time can be increased at high humidity during processing. In addition, the hydrophobia of the adhesive ensures that the crosslinked adhesive layer is impervious to moisture and thus the mechanical properties remain largely stable even under moist climatic conditions, along with high resistance to aging.

The prefix "poly" in names for substances, such as "polyol", "polyisocyanate", "polyether", or "polyepoxide", indicates in the present document that the respective substance formally contains more than one of the corresponding functional group per molecule.

The term "oleochemical" polyols as used in the present invention is understood to refer to polyols based on fats and oils of vegetable or animal origin, as well as the petrochemically-prepared product equivalents. Preferably, however, this involves polyols based on fats and oils of vegetable or animal origin. It is especially preferable for the polyols to be fats or oils of vegetable or animal origin. This preferably involves hydroxy group-containing esters of fatty acids, preferably mono-, di-, or triglycerides. The aforementioned fatty acids involve carboxylic acids having preferably 6 to 40, further preferably 8 to 30, especially preferably 14 to 26 carbon atoms. This may entail saturated or unsaturated fatty acids. The oleochemical polyols may involve natural, hydroxy group-containing fats and oils, such as, for example, castor oil. This may also, however, entail polyols produced from natural fats and oils, e.g., the reaction products of epoxidized fatty substances with mono-, di- or polyfunctional alcohols or fatty acid glycerol esters that are at least partially substituted with hydroxy groups. A further group of oleochemical polyols are ring-opening and trans-esterification products of epoxidized fatty acid esters of lower alcohols, i.e. of epoxidized fatty acid methyl, ethyl, propyl, or butyl esters. Examples to be mentioned include ring-opening and transesterification products with alcohols bearing 2 to 4 hydroxy groups, in particular the reaction products with ethylene glycol, propylene glycol, oligomeric ethylene glycols, oligomeric propylene glycols, glycerol, trimethylolpropane, or pentaerythritol. It is also possible to use derivatives of dimer fatty acid, such as dimer fatty acid diols. Examples of commercial products include Sovermol® 320, 650, 750, 760, 805, 810, 815, 818, 819, 860, 908, 1005, 1014, 1055, 1058, 1083, 1092, 1095, 1102, 1111, or 1140. It is also possible to use mixtures of two or more of the aforementioned oleochemical polyols, which preferably have an OH equivalent weight of 150 to 500 g/eq and an OH functionality of 2.3 to 4. The oleochemical polyols are contained in the polyol component of the adhesive at 2 to 30% by weight, preferably 10 to 20% by weight.

Examples that can be used as polyols having 3 to 14 hydroxy groups include ethoxylation and/or propoxylation products of trimethylolpropane, glycerol, polyglycerol, pentaerythritol, erythritol, sugar alcohols or hydrogenated sugar alcohols such as xylite, dulcite, mannite or sorbitol or maltitol, of carbohydrates such as sucrose, dextrose, inverted sugar, rhamnose, lactose, trehalose, maltose, cellobiose, melibiose, gentiobiose, starch decomposition products such as hydrogenated starch hydrolysates or the mixtures. It is preferable to use ethoxylation and/or propoxylation products having up to 15 alkylene oxide units. The preparation of such polyols is described, for example, in WO 2012/134849 A1. Alternatively, the non-alkoxylated sugar alcohols may also be used. The polyols having 3 to 14 hydroxy groups are contained in the polyol component of the adhesive at 5 to 35% by weight, preferably 15 to 30% by weight.

Polyols based on ethoxylated and/or propoxylated polyphenols are, for example, ethoxylated and/or propoxylated Bisphenol A, Bisphenol B, or Bisphenol F. Preferably, propoxylation products of Bisphenol A having a degree of propoxylation of 2 to 3, especially preferably 2, are used. The degree of propoxylation indicates how many propylene oxide units in the agent are reacted with a bisphenol. For example, with a degree of propoxylation of 2 in the agent, then each phenolic group of a bisphenol molecule has reacted only with one propylene oxide. The ethoxylated or propoxylated polyphenols are contained in the polyol component at 5 to 35% by weight, preferably 10 to 20% by weight relative to the total weight of the polyol component.

The isocyanate component contains aromatic and/or aliphatic polyisocyanates. In a preferred embodiment, the isocyanate component comprises both aromatic and aliphatic polyisocyanates.

Examples that can be used as the aromatic polyisocyanate of the isocyanate component include 2,4'-diphenylmethane diisocyanate, 4,4'-diphenylmethane diisocyanate, a mixture of 2,4'-diphenylmethane diisocyanate and 4,4'-diphenylmethane diisocyanate, a polymeric isocyanate based on 2,4'- and 4,4'-diphenylmethane diisocyanate having an NCO functionality of 2.0 to 3.2, or a mixture of the above-mentioned diphenylmethane diisocyanates. In a preferred embodiment, the at least one aromatic polyisocyanate is contained in the isocyanate component of the adhesive at 30 to 80% by weight, especially preferably 35 to 60% by weight.

Examples that can be used as the aliphatic polyisocyanate of the isocyanate component include tetramethoxybutane-1,4-diisocyanate, butane-1,4-diisocyanate, hexane-1,6-diisocyanate (HDI), 1,6-diisocyanato-2,2,4-trimethylhexane, 1,6-diisocyanato-2,4,4-trimethylhexane, 1,12-dodecane diisocyanate (C12DI), isophorone diisocyanate (3-isocyanate methyl-3,5,5-trimethylcyclohexyl isocyanate, IPDI) as well as the reaction products thereof with glycerol or trimethylolpropane, or trimerization products thereof. It is preferable to use trimerized hexamethylene diisocyanate (HDI), preferably having an NCO functionality of 2.5 to 3.8. In a preferred embodiment, the at least one aliphatic polyisocyanate is contained in the isocyanate component of the adhesive at 20 to 70% by weight, especially preferably 30 to 60% by weight.

The glass fibers preferably used according to the present invention are so-called "short fibers", which are also known as "glass fiber filler" or "milled fibers". They are preferably characterized by a fiber thickness, i.e., fiber diameter between 5 and 30 μm and a fiber length between 50 and 350 μm. Especially preferred are glass fibers that have been coated with an aminosilane-based sizing agent. Examples of such aminosilanes include N-(2-aminoethyl)(3-aminopropyl) trimethoxysilane, (3-aminopropyl) triethoxysilane, N-(2-aminoethyl)(3-aminopropyl) methyldimethoxysilane, (3-aminopropyl) trimethoxysilane, (N-cyclohexylaminomethyl) methyldiethoxysilane, (N-cyclohexylaminomethyl) triethoxysilane, (N-phenylaminomethyl) methyldimethoxysilane, and (N-phenylaminomethyl) trimethoxysilane. The sizing agent content of the dried glass fibers is then preferably 0.2 to 2.0% by weight relative to the total weight of the coated fibers. The proportion of glass fibers in the polyol component is 1 to 65% by weight, preferably 10 to 50% by weight, especially preferably 20 to 40% by weight relative to the total weight of the polyol component.

The polyol component furthermore contains at least one catalyst. Metal catalysts are preferably used as catalysts. Metal catalysts are understood in the present invention to mean those catalysts that contain at least one metal atom as the catalytic center. This preferably involves the usual metal catalysts that are known in polyurethane chemistry, such as iron or, in particular, also tin compounds. Examples of these are 1,3-dicarbonyl compounds of iron, such as iron(III)-acetylacetonate, and preferably compounds of di- and tetravalent tin, in particular the Sn(II)-carboxylates or the dialkyl-Sn(IV)-dicarboxylates such as e.g. tin(II) octoate, dibutyltin dilaurate, dibutyltin diacetate, dioctyltin diacetate, and dibutyltin maleate. The metal catalysts then preferably contain no metal-carbon bond. Preferred metal catalysts are, in particular, tin compounds, especially those that have no tin-carbon bond. Very especially preferred are cyclic tin compounds of formulae I to IV

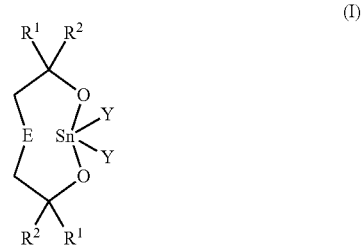

-continued

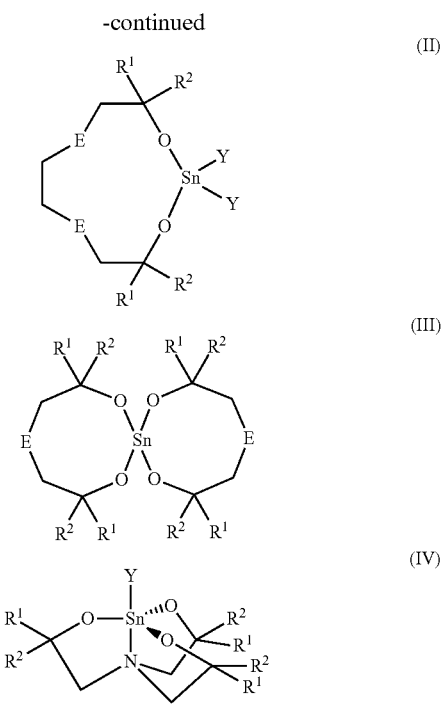

In formulae I to IV,
E=—N(R³)—, —O—, —S—, or —C(R³)₂—;
R¹, R²=H, alkyl, or aryl;
R³=H, alkyl, aryl, or —(CH₂)$_n$X, where n=1 to 12, and X=—N(R¹)₂, —OR¹, —SR¹, —P(R¹)₂ or —P(=O)(R⁴)₂;
R⁴=alkyl, aryl, —O(C₂H₅), or —O-iso(C₃H₇); and
Y=halogen, preferable Cl, Br, I, —OR¹; —OC(=O)R¹; —SR¹, or —OP(=O)(R⁴)₂;
wherein the aryl moieties preferably contain 6 to 12 carbon atoms and the alkyl moieties preferably contain 1 to 12 carbon atoms.

Mixtures of the foregoing catalysts may also be used. These are preferable used in an amount of 0.005 to 1% by weight, especially preferably 0.01 to 0.5% by weight relative to the total weight of the polyol component.

The two-component PU adhesive according to the present invention may additionally contain one or more additives or auxiliaries. These are understood to be substances which are added in order to modify the properties of the adhesive in a desired direction, such as for example the viscosity, the wetting behavior, the stability, the bubble formation, the shelf life, or the adherence, but also in order to adapt the properties of use to the purpose of application. Examples of additives or auxiliaries are fillers, flow modifiers, deaerating agents, thixotropic agents, anti-aging agents, dessicants, resins, plasticizers, stabilizers, wetting agents, dyes, color pastes, or pigments. The additives or auxiliaries are preferably entirely or partially added into the polyol component, namely, in a mass fraction of 0 to 65% by weight, preferably 1 to 50% by weight, very preferably 2 to 40% by weight, especially preferably 4 to 30% by weight, relative to the total weight of the polyol component. The isocyanate component may, however, also contain additives or auxiliaries, e.g., thixotropic agents and/or dessicants, provided that the storage stability of the isocyanate component is not lowered thereby.

Suitable stabilizers are understood, within the meaning of the present invention, to mean antioxidants, UV-stabilizers, or hydrolysis stabilizers. Examples of these are the commercially-available sterically-hindered phenols and/or thioethers and/or substituted benzotriazoles and/or amines of the "HALS" (Hindered Amine Light Stabilizer) type.

Resins may involve natural resins or synthetic resins. Examples are shellac, colophonium, tall oil resins, gum resins or wood rosins, hydrocarbon, terpene, cumaron/indene, furan, alkyd, glycerol ester, urea, melamine, polyamide resins, in particular also aldehyde, ketone, or phenol resins. The resins generally have a low melting point and are advantageous, inter alia, for improved compatibility of the components. One particular embodiment uses hydroxy group-containing resins containing OH groups, in particular, those having a plurality of hydroxy groups. These may then also react with the isocyanates. In a preferred embodiment, the amounts may be between 5 to 30% by weight relative to the total weight of the polyol component.

Especially suitable fillers are inorganic compounds that are not reactive to isocyanates. Examples of suitable fillers and pigments include natural, ground chalk, precipitated chalk, heavy spar, talcum, mica, carbon black, titanium dioxide, iron oxides, aluminum oxide, zinc oxide, zinc sulfate, and/or silicon dioxide. Water-absorbing powders, for example zeolite, may also be present as a filler. The fillers have a particle size of 1 to 200 μm, in particular, 1 to 50 μm, but may also entail nanoscale pigments. The amount of the fillers and pigments is preferably up to 60% by weight, especially preferably 5 to 40% by weight relative to the total weight of the polyol component. The amount of fillers affects the hardness of the crosslinked adhesive. The amount and selection of the filler can also affect the viscosity.

The additives or auxiliaries are preferably selected so as not to react with the isocyanates, especially during the duration of the cross-linking reaction. In particular, substantially no additives or auxiliaries that promote the formation of bubbles in the two-component PU adhesive, e.g., carboxylic acids, should be added. The two-component PU adhesive according to the present invention should further preferably contain substantially no organic solvents that are, for example, volatile at temperatures of up to 120° C. Plasticizers should also be substantially non-existent.

The terms "substantially non-existent" or "substantially not contained" or "substantially not added" are understood within the scope of the present invention to mean that the proportion of the relevant components is less than 2% by weight, preferably less than 1% by weight, very preferably less than 0.5% by weight, especially preferably 0% by weight, relative to the total amount of the two-component PU adhesive.

The NCO/OH ratio, i.e., the molar ratio of the isocyanate groups contained in the isocyanate component to the OH groups contained in the polyol component, general lies in the range of equivalence, wherein a low surplus of isocyanate groups may be advantageous in view of moisture possibly present on the surface. The NCO/OH ratio should preferably be between 0.90:1 and 1.5:1, in particular, between 1.0:1 and 1.3:1.

To prepare the two-component PU adhesive according to the present invention, first the polyol component is prepared. For this purpose, the polyols may be mixed optionally under heating. Then, it is advantageously to dissolve optionally solid components in the mixture, so far as this is possible. Thereafter, the additives or auxiliaries are mixed in and dispersed. The moisture content should then be kept low. For example, water can be avoided through the use of molecular sieves. Inert additives or auxiliaries may also be mixed partially into the isocyanate component. The polyol component and the isocyanate component are stored separately up until use thereof. For use, these two components are mixed together in a manner known per se and the mixture is applied to at least one of the adherent substrates.

The two-component PU adhesive according to the present invention should preferably be liquid to pasty, especially preferably pasty, at processing temperature, i.e., between 10° C. and 40° C. It should preferably be applicable as a film or bead and, on application, should not run on the substrate. In an especially preferred embodiment, the two-component PU adhesive according to the present invention is thixotropic.

Since large areas often have to be adhesively bonded and in order to allow accurate alignment of the adherent substrate parts, a long open time is necessary. In a preferred embodiment, an open time of more than 50 min is achieved. The term open time is understood to be the period of time that remains after the complete mixing of the two-component adhesive for a proper processing, before the consistency of the two-component PU adhesive has changed as a result of the beginning reaction to such a degree that an application, the initial flow on the substrate, and a good adhesion can no longer be achieved. The change in the adhesive composition may here be due to the intended crosslinking reactions, but secondary reactions may also have a negative impact on the open time. Under laboratory conditions, the so-called pot time can be determined in order to assess the open time. The pot time is the period of time between complete mixing of the components and the beginning of the thread-pulling of the adhesive mixture.

It has surprisingly been shown with the catalyst-containing two-component PU adhesive according to the present invention that the catalyst action is intensified by the glass fibers. This is especially significant for two-component PU adhesives that have aliphatic isocyanates, because aliphatic isocyanates commonly exhibit a lower reactivity compared to aromatic isocyanates and the two-component PU adhesives therefore commonly have very long curing times. If long pot life or open time is also required, then it is preferable to use catalysts or catalyst systems that are not reactive or have low reactivity at room temperature and are activated with a temperature increase, e.g., combinations of tin compounds and complexing agents. Complexing agents and chelating agents, within the meaning of the present invention, are compounds that are capable of forming complex, preferably complexation or masking of the tin. Examples of such complexing agents are tropolone, maltol, ethylmaltol, 3-hydroxyflavone, salicylhydroxamic acid, N,N'-bis(salicylidene) ethylenediamine, kojic acid, 8-hydroxyquinoline, acetylacetone, acetoacetate, gallic acid ethyl ester, dehydroacetic acid, 2,5-dihydroxy-1,4-benzoquinone, dithizone, or tannin. Chelating agents and tin-based catalysts are preferably used in a total amount of 0.01 to about 5% by weight relative to the total weight of the polyol component.

Measurement Method

The molecular weights set forth in the present text refer to the number-average molecular weight (Mn), unless otherwise specified. All molecular weights mentioned are values obtainable by gel permeation chromatography (GPC) according to the standard DIN 55672-1 (2007) with THF as the eluent against a polystyrene standard, unless otherwise indicated.

The glass transition temperatures set forth in the present text are determined by means of dynamic differential thermal analysis (differential scanning calorimetry (DSC) according to EN ISO 11357-2 (2014), unless otherwise indicated.

The tensile shear strengths set forth in the present text are determined according to the standard DIN EN 1465 (2009), unless otherwise indicated.

The E-moduli (moduli of elasticity), elongations at break, and tensile strengths set forth in the present text are determined according to the standard DIN EN ISO 527-2 (2012), unless otherwise indicated.

The NCO functionality of a compound is understood in the present text to mean the average number of NCO groups per molecule. The NCO functionality is calculated from the number-average molecular weight and the NCO content of the compound. The NCO content is determined according to the standard DIN EN ISO 11909 (2007), unless otherwise indicated. The quotient of the number-average molecular weight and the NCO functionality yields the NCO equivalent weight of the compound.

The OH functionality of a compound is understood to mean the average OH functionality. It indicates the average number of hydroxy groups per molecule. The average OH functionality of a compound is calculated on the basis of the number-average molecular weight and the hydroxyl value. The hydroxyl value of a compound is determined according to the standard DIN 53240-1 (2012), unless otherwise indicated. The quotient of the number-average molecular weight and the OH functionality yields the OH equivalent weight of the compound.

The open time is assessed according to the present invention by the following method: An adhesive bead measuring 4 cm high and 10 cm wide is applied to a plate made of glass fiber-reinforced plastic (GFR plastic) measuring 3 mm thick, and manually compressed after established times at 35° C. and 70% relative humidity after a second GFR plate has been laid thereon. Then, the thickness of the adhesive layer is adjusted with spacers to 3 mm. The bead should still be homogeneously compressible within the open time after application of the adhesive mixture, i.e., the adhesive thus appears visually to be a homogeneous mass on compression, and has no partial regions that are already cured, which would be visible as solid particles. This is followed by curing of the adhesive over 24 hr. at 80° C. After test specimens are cut out from the adhesively bonded plates, the tensile shear strength is determined. The calculated tensile shear strengths are compared with values obtained from test specimens that are compressed immediately after the adhesive application.

The following method is used to determine the pot time: A plastic container or paper cup is filled with the components of the two-component PU adhesive (total weight: 100 g), having been pre-heated to 20±1° C., which are then mixed under constant stirring by means of a wooden spatula. The beginning of the mixing represents the starting time zero for the measurement. During the stirring, the wooden spatula is pulled out at regular time intervals (5 min), and the run-off behavior of the adhesive from the wooden spatula is observed. The period of time from the beginning of the measurement to the point in time at which non-runny threads of the mixture can be drawn and the transition from a viscous liquid to a firm paste is achieved is called the pot time.

The flow behavior and the stability of pasty two-component polyurethane systems is tested with the aid of a run-off test on sheet steel. For this purpose, the sheet steel is degreased with 2-propanol. The two components are tempered at 20±1° C. and weighed in the prescribed mixing ratio (total weight 100 g). With the aid of a template, a defined shape (45×23×9 mm large adhesive block) is applied so as to have no bubbles on the sheet steel. The surface is smoothed with a spatula. Then, the template is lifted up vertically. The upper and lower edge position of the adhesive block is marked on the sheet, and the sheet steel is immediately hung up or placed in a vertical position. The running streak of the adhesive is measured after a defined measuring time (15 minutes). The composition is, within the meaning of the present application, designated as being pasty if the adhesive block does not migrate on the marked baseline, i.e., if no displacement directly on the sheet steel is observed, within the defined measurement time. The adhesive block is then allowed to have an inclination or curvature in regions that are not in direct contact with the sheet steel.

The following examples further clarify the present invention. Unless otherwise specified, quantities of a component set forth in weight percent (mass percent) are in reference to the total weight of the respective component containing said component.

The tensile shear strength, the tensile strength, the E-modulus, and the glass transition temperature were determined after curing over 24 hrs. at 80° C., unless otherwise indicated.

EXAMPLES

Example 1 (not According to the Present Invention)

Polyol component (OH component):

| | |
|---|---|
| Sugar-based polyol[1] | 22.5 |
| Sovermol 805 [2] | 5.0 |
| Sovermol 819 [3] | 10.0 |
| Propoxylated Bisphenol A [4] | 10.5 |
| Molecular sieve | 8.0 |
| Calcium carbonate, coated | 44.0 |

Isocyanate component (NCO component):

| | |
|---|---|
| Lupranat MIS [5] | 58.5 |
| Desmodur N 3300 [6] | 30.0 |
| Molecular sieve | 5.5 |
| Pyrogenic silicic acid | 6.0 |

1) OH functionality between 4 and 5
2) fatty acid esters, Fa. BASF, OH equivalent weight 330 g/eq, OH functionality 3.5
3) fatty acid esters, Fa. BASF, OH equivalent weight 234 g/eq, OH functionality 2.6
4) OH equivalent weight 174 g/eq, degree of propoxylation: ca. 2
5) MDI mixture made of 50% by weight 4,4-MDI and 50% by weight 2.4-MDI, Fa. BASF, NCO content 33.5% by weight
6) trimerized hexamethylene diisocyanate, Fa. Bayer Material Science, NCO content 21.8%, NCO equivalent weight 193 g/eq Mixing ratio: 100 parts by weight of the polyol component to 60 parts by weight of the isocyanate component

| | | | | | |
|---|---|---|---|---|---|
| Pot time (at room temperature) | | | 165 min | | |
| Glass transition temperature | | | 75° C. | | |
| Tensile strength (24 hr., 80° C.) | | | 46.1 MPa | | |
| Tensile strength (7 hr., 70° C.) | | | 27.9 MPa | | |
| E-module | | | 3880 MPa | | |
| t/min | 0 | 40 | 50 | 60 | 70 |
| Compressibility (open time) [0)] | + | + | + | + | (+) |
| Tensile shear strength/MPa | 16.0 | 16.0 | 14.7 | 12.9 | 9.6 |

[0)] + ~ good, (+) ~ still good, − − insufficient

Example 2 (not According to the Present Invention)

Polyol component (OH component):

| | |
|---|---|
| Sugar-based polyol[1] | 22.5 |
| Sovermol 805 [2] | 5.0 |
| Sovermol 819 [3] | 10.0 |
| Propoxylated Bisphenol A [4] | 10.5 |
| Molecular sieve | 8.0 |
| Calcium carbonate, coated | 8.0 |
| Glass fibers [7] | 36.0 |

Isocyanate component (NCO component):

| | |
|---|---|
| Lupranat MIS [5] | 58.5 |
| Desmodur N 3300 [6] | 30.0 |
| Molecular sieve | 5.5 |
| Pyrogenic silicic acid | 6.0 |

7) short fibers with aminosilane sizing agent, fiber thickness between 5 and 30 μm, fiber length between 50 and 350 μm, sizing agent content of the dried glass fibers 0.2 to 2.0% by weight Mixing ratio: 100 parts by weight of the polyol component to 60 parts by weight of the isocyanate component

| | | | | | |
|---|---|---|---|---|---|
| Pot time (at room temperature) | | | 165 min | | |
| Glass transition temperature | | | 75° C. | | |
| Tensile strength (24 hr., 80° C.) | | | 56.0 MPa | | |
| Tensile strength (7 hr., 70° C.) | | | 36.4 MPa | | |
| E-modulus | | | 4,800 MPa | | |
| t/min | 0 | 40 | 50 | 60 | 70 |
| Compressibility (open time) [0)] | + | + | + | + | (+) |
| Tensile shear strength/MPa | 17.3 | 17.0 | 14.9 | 13.5 | 10.5 |

Example 3 (According to the Present Invention)

Polyol component (OH component):

| | |
|---|---|
| Sugar-based polyol[1] | 22.500 |
| Sovermol 805 [2] | 5.000 |
| Sovermol 819 [3] | 10.000 |
| Propoxylated Bisphenol A [4] | 10.500 |
| Molecular sieve | 8.000 |
| Calcium carbonate, coated | 7.665 |
| Glass fibers [7] | 36.000 |
| Dibutyltin dilaurate | 0.035 |
| 8-Hydroxyquinoline | 0.300 |

Isocyanate component (NCO component):

| | |
|---|---|
| Lupranat MIS [5] | 58.5 |
| Desmodur N 3300 [6] | 30.0 |
| Molecular sieve | 5.5 |
| Pyrogenic silicic acid | 6.0 |

Mixing ratio: 100 parts by weight of the polyol component to 60 parts by weight of the isocyanate component

| | |
|---|---|
| Pot time (at room temperature) | 65 min |
| Glass transition temperature | 75° C. |
| Tensile strength (24 hr., 80° C.) | 56.3 MPa |
| Tensile strength (7 hr., 70° C.) | 51.1 MPa |
| E-module | 4880 MPa |

| t/min | 0 | 40 | 50 | 60 | 70 |
|---|---|---|---|---|---|
| Compressibility (open time) [0] | + | + | + | (+) | − |
| Tensile shear strength/MPa | 17.0 | 17.3 | 14.0 | 10.1 | 1.0 |

The example 3 according to the present invention has a sufficiently long open time, but has a desired shorter curing time than the comparison examples.

Example 4

The composition of the OH component corresponds to the examples 2 and 3, but the amounts of coated calcium carbonate and glass fibers were varied according to the following tables. The isocyanate component is unaltered.

Compositions according to example 2 (without catalyst) with varying amounts of coated calcium carbonate and glass fibers:

| | | | | | |
|---|---|---|---|---|---|
| Coated calcium carbonate | 44.0 | 34.0 | 24.0 | 14.0 | 8.0 |
| Glass fibers [7] | 0.0 | 10.0 | 20.0 | 30.0 | 36.0 |
| Tensile strength/MPa (7 hr., 70° C.) | 27.9 | 28.8 | 31.0 | 35.0 | 36.4 |
| Tensile strength/MPa (24 hr., 80° C.) | 46.1 | 47.0 | 48.6 | 54.1 | 56.0 |

Compositions according to example 3 (with catalyst) with varying amounts of coated calcium carbonate and glass fibers:

| | | | | | |
|---|---|---|---|---|---|
| Coated calcium carbonate | 43.66 | 33.66 | 23.66 | 13.66 | 7.66 |
| Glass fibers [7] | 0 | 10.0 | 20.0 | 30.0 | 36.0 |
| Tensile strength/MPa (7 hr., 70° C.) | 34.0 | 34.8 | 36.5 | 47.5 | 51.1 |
| Tensile strength/MPa (24 hr., 80° C.) | 46.1 | 46.8 | 48.9 | 53.9 | 56.3 |

The results show that in the catalyst-free system, the difference in tensile strength between curing in 7 hr. at 70° C. and 24 hr. at 80° C. is greater than in the catalyst-containing system, and that the difference in tensile strength in the catalyst-containing system is reduced as the glass fiber concentration increases.

In the catalyst-containing system, the higher the content of glass fibers, the closer the tensile strength after 7 hr. of curing at 70° C. is to the tensile strength after 24 hr. of curing at 80° C. Thus, the glass fibers intensify the catalyst action in the catalyst-containing adhesives.

The invention claimed is:
1. A two-component polyurethane adhesive, comprising
i) a polyol component containing at least one catalyst, wherein the catalyst in the two component polyurethane adhesive comprises a metal catalyst and:
   a. 2 to 30% by weight at least one oleochemical polyol having a number-average molecular weight (Mn) of at least 500 g/mol;
   b. 5 to 35% by weight at least one polyol that is different from (a) and has 3 to 14 hydroxy groups;
   c. 5 to 35% by weight at least one polyol that is different from (a) and (b) selected from ethoxylated and/or propoxylated polyphenols;
   d. 10 to 50% by weight glass fibers or a mixture of different glass fibers;
   e. 0 to 65% by weight at least one additive or auxiliary that is different from (a) to (d);
   wherein the mass fractions of the components (a) to (e) are relative to the total weight of the polyol component; and
ii) an isocyanate component containing aromatic and/or aliphatic polyisocyanates in an NCO/OH ratio of 0.9:1 to 1.5:1; and
wherein the metal catalyst is a tin compound,
wherein the catalyst further comprises at least one complexing agent selected from the group consisting of tropolone, maltol, ethylmaltol, 3-hydroxyflavone, salicylhydroxamic acid, N,N'-bis(salicylidene) ethylenediamine, kojic acid, 8-hydroxyquinoline, acetoacetate, gallic acid ethyl ester, dehydroacetic acid, 2,5-dihydroxy-1,4-benzoquinone, dithizone, and tannin; and
wherein the crosslinked two-component polyurethane adhesive has a glass transition temperature (Tg) of at least 65° C.

2. The two-component polyurethane adhesive according to claim 1, wherein the glass fibers have a fiber thickness between 5 and 30 μm and a fiber length between 50 and 350 μm.

3. The two-component polyurethane adhesive according to claim 1, wherein the glass fibers are coated with an aminosilane-based sizing agent, and the sizing agent content of the dried glass fibers is 0.2 to 2.0% by weight relative to the total weight of the coated glass fibers.

4. The two-component polyurethane adhesive according to claim 1, wherein the tin compound does not have a tin-carbon bond.

5. The two-component polyurethane adhesive according to claim 4, wherein the tin compound is a cyclic tin compound of one of formulae I to IV:

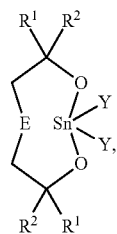

(I)

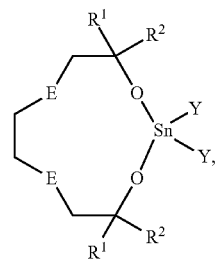

(II)

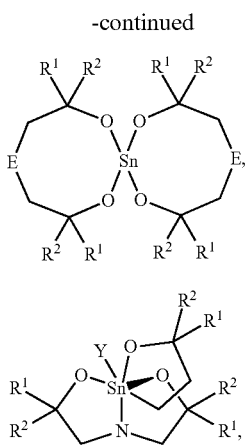
(III)

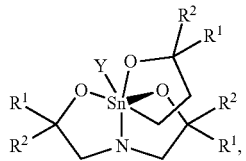
(IV)

wherein:
E=—N(R³)—, —O—, —S—, or —C(R³)₂—;
R¹, R²=H, alkyl, or aryl;
R³=H, alkyl, aryl, or —(CH₂)ₙX, where n=1 to 12, and X=—N(R¹)₂, —OR¹, —SR¹, —P(R¹)₂ or —P(=O)(R⁴)₂;
R⁴=alkyl, aryl, —O(C₂H₅), or —O-iso(C₃H₇); and
Y=halogen, —OR¹; —OC(=O)R¹; —SR¹, or —OP(=O)(R⁴)₂;
wherein the aryl moieties contain 6 to 12 carbon atoms, and the alkyl moieties contain 1 to 12 carbon atoms.

6. The two-component polyurethane adhesive according to claim 1, wherein the polyol component comprises the complexing agent and the metal catalyst in a total amount of 0.01 to about 5% by weight relative to the polyol component.

7. The two-component polyurethane adhesive according to claim 1, wherein the crosslinked adhesive has an E-modulus of at least 4,000 MPa and a tensile strength of at least 40 MPa.

8. The two-component polyurethane adhesive according to claim 1, wherein the oleochemical polyol(s) has/have an OH equivalent weight of 150 to 500 g/eq and an OH functionality of 2.3 to 4.

9. The two-component polyurethane adhesive according to claim 1, wherein component (b) is selected from ethoxylated and/or propoxylated carbohydrates.

10. The two-component polyurethane adhesive according to claim 1, wherein component (c) is selected from the group consisting of propoxylated Bisphenol A, propoxylated Bisphenol B, propoxylated Bisphenol F, or mixtures thereof.

11. The two-component polyurethane adhesive according to claim 1, wherein component (c) is selected from the group consisting of propoxylated Bisphenol A, propoxylated Bisphenol B, propoxylated Bisphenol F, or mixtures thereof, with a degree of propoxylation of 2.

12. A two-component polyurethane adhesive according to claim 1, wherein the aromatic polyisocyanate is 2,4'-diphenylmethane diisocyanate, 4,4'-diphenylmethane diisocyanate, a mixture of 2,4'-diphenylmethane diisocyanate and 4,4'-diphenylmethane diisocyanate, a polymeric isocyanate based on 2,4'- and/or 4,4'-diphenylmethane diisocyanate having an NCO functionality of 2.0 to 3.2, or a mixture of two or more of the aforementioned aromatic polyisocyanates.

13. The two-component polyurethane adhesive according to claim 1, wherein the aliphatic polyisocyanate is a trimerized hexamethylene diisocyanate.

14. The two-component polyurethane adhesive according to claim 1, wherein the polyol component comprises 20 to 40% by weight glass fibers or mixture of different glass fibers.

15. The two-component polyurethane adhesive according to claim 1, wherein the at least one complexing agent is selected from the group consisting of tropolone, maltol, ethylmaltol, 3-hydroxyflavone, salicylhydroxamic acid, N,N'-bis(salicylidene) ethylenediamine, kojic acid, acetylacetone, acetoacetate, gallic acid ethyl ester, dehydroacetic acid, 2,5-dihydroxy-1,4-benzoquinone, dithizone and tannin.

16. An article comprising the two-component polyurethane adhesive according to claim 1 adhesively bonded to a substrate comprising metal, plastic, foam, fiber composite, a fiber-containing shaped body, a fiber composite or a fiber-containing shaped body comprising glass fibers, carbon fibers, natural fibers, or synthetic fibers embedded in a plastic matrix.

17. An article comprising two substrates bonded together by cured reaction products of the two-component polyurethane adhesive according to claim 1.

18. The article of claim 17 where each substrate independently comprises metal, plastic, foam, a fiber composite, a fiber-containing shaped body, a fiber composite and a fiber-containing shaped body, wherein fiber is selected from glass fibers, carbon fibers, natural fibers, or synthetic fibers.

* * * * *